United States Patent
Greenblatt et al.

(10) Patent No.: US 10,489,418 B2
(45) Date of Patent: Nov. 26, 2019

(54) SYSTEM FOR INLINE MESSAGE DETAIL EXTRACTION AND TRANSFORMATION

(71) Applicant: BANK OF AMERICA CORPORATION, Charlotte, NC (US)

(72) Inventors: Jonathan Roger Greenblatt, Elkton, MD (US); Sundar R. Krishnan, Plano, TX (US); James J. Rea, Turnersville, NJ (US); David J. Watson, Greer, SC (US); Prasanta Kumar Parida, Newark, DE (US); Amit Ashok Pathak, Kennett Square, PA (US); M. Ehsan Khan, Kennett Square, PA (US); Umashankar Awasthi, Uttar Pradesh (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 647 days.

(21) Appl. No.: 14/879,206

(22) Filed: Oct. 9, 2015

(65) Prior Publication Data
US 2017/0103113 A1    Apr. 13, 2017

(51) Int. Cl.
*G06F 16/25* (2019.01)
*G06F 13/14* (2006.01)

(52) U.S. Cl.
CPC .................. *G06F 16/258* (2019.01)

(58) Field of Classification Search
CPC ......... G06F 17/30917; G06F 17/30569; G06F 17/30345; G06F 17/30516; G06F 17/30563; G06F 17/30914; G06F 17/30935; G06F 17/227; G06F 17/272; G06F 17/289; G06F 16/258; G06F 16/84; G06F 17/2258

USPC ........ 707/999.107, E17.125, 999.1, 999.101, 707/999.104, 602; 709/201, 230; 370/466; 358/405, 448, 462; 715/768
See application file for complete search history.

(56) References Cited

U.S. PATENT DOCUMENTS

| | | | |
|---|---|---|---|
| 7,058,645 B2 * | 6/2006 | Seto | G06F 17/30914 |
| 7,328,403 B2 * | 2/2008 | Ramarao | G06F 16/80 |
| | | | 715/236 |
| 7,590,644 B2 | 9/2009 | Matsakis et al. | |
| 8,065,685 B2 * | 11/2011 | Cermak | G06F 17/2247 |
| | | | 715/236 |
| 8,650,480 B2 | 2/2014 | Sahota et al. | |
| 2001/0039540 A1 * | 11/2001 | Hofmann | G06F 9/541 |
| 2004/0205619 A1 * | 10/2004 | Twede | G06F 17/2264 |
| | | | 715/235 |
| 2006/0294253 A1 * | 12/2006 | Linderman | G06F 17/30607 |
| | | | 709/230 |

(Continued)

*Primary Examiner* — Alford W Kindred
*Assistant Examiner* — Cecile H Vo
(74) *Attorney, Agent, or Firm* — Michael A. Springs; Moore & Van Allen PLLC; James C. Edwards

(57) ABSTRACT

The present invention provides for inline/parallel processing of data messages, specifically data response messages, to both transform and parse the data in one single pass. Parsing includes extracting common data elements (such as, error codes, fault codes, status codes and the like) from the message and deleting generic headers from the messages. In specific embodiments of the invention, the parallel processing of the present invention is made possible by implementation of a SAX parser. In such embodiments of the invention, the SAX parser implements a single filter to both transform and parse the data response messages simultaneously.

10 Claims, 7 Drawing Sheets

(56) References Cited

U.S. PATENT DOCUMENTS

| | | | |
|---|---|---|---|
| 2007/0038930 A1* | 2/2007 | Derrick | G06F 17/2247 715/236 |
| 2014/0114825 A1* | 4/2014 | Krikorian | G06Q 30/04 705/34 |
| 2015/0261563 A1* | 9/2015 | Guerin | G06F 9/466 707/703 |

* cited by examiner

SYSTEM FOR INLINE MESSAGE DETAIL EXTRACTION AND TRANSFORMATION

FIELD

In general, embodiments of the invention relate parallel processing of data messages inline through one pass to both transform and parse the data. In specific embodiments, a single filter in a SAX (Simple API (Application Program Interface) for XML (Extensible Markup Language) parser is implemented to both parse and transform in a single step.

BACKGROUND

Mainframe processing of data messages typically require the data be transformed or otherwise processed to properly format the data. For example, in a large enterprise, such as a financial institution, client applications, which may be internal or external (i.e., $3^{rd}$ party or the like) may generate data request messages, which are communicated to the enterprise where they are processed (i.e., transformed or the like) prior to communicating the data request messages to a target system mainframe (typically a $3^{rd}$ party) for subsequent processing of the request. In specific instances, the flow is bi-directional meaning the target system mainframe will return a data response message once the request has been processed. In such instances, the data response message will be processed (i.e., transformed or the like) prior to communicating the data response message to a designated storage location, which may be associated with the client application or independent of the client application. In other specific instances, the flow may be unidirectional meaning the target system mainframe receives and processes the data request message but no data response message is required to be returned.

In conventional data message processing, in order to transform/normalize data and perform other processes on the data (e.g., parsing/extraction and the like) the entire data message is read into a buffer, a tree is built and the entire tree is analyzed, resulting in two passes through the data message.

In high volume enterprise systems, such as a financial institution system, which may process thousands of data requests at any one point in time, such conventional data message processing, which entails two passes, is processing-intensive, thus resulting in an inefficient overall process.

Therefore, a need exists to develop systems, apparatus, computer program products, methods and the like that limit the complexity involved with processing (i.e., transforming/normalizing) the data messages. Specifically, the desired systems, apparatus, computer program products and methods should limit the processing for both bidirectional flows, in which data quest messages and data response messages are processed, as well as unidirectional flows in which only data requests messages are received and processed. Moreover, the desired systems, apparatus, computer program products and methods should more efficiently process the data messages by limiting the number of passes required to process the data and/or limit the data from being held in memory.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer program products, methods or the like for inline (i.e., parallel) processing of data response messages to both transform and parse the data in one pass. Parsing includes extracting common data elements (such as, error codes, fault codes, status codes and the like) from the message and deleting generic headers from the messages. The extracted common data elements are subsequently re-inserted into the data response messages prior to communicating the transformed data response message to a source system/client application. In specific embodiments of the invention, the parallel processing of the present invention is made possible by implementation of a SAX (Simple API (Application Program Interface) for XML (Extensible Markup Language) parser. In such embodiments of the invention, the SAX parser implements a single filter to both transform and parse the data response messages simultaneously.

By performing the parsing of the data response messages inline, specifically, analysis of common data elements inline, the present invention, eliminates the need to read the whole message first and then perform requisite analysis. In conventional processing of data messages, the entire message is read into a buffer, a tree of members is built and the tree is then analyzed, thus, requiring two passes. In the present invention, by reading in the data and transforming the data together in one pass, the amount of processing required is minimized (e.g., 50 percent less processing), thus requiring less burden on the processor. In an enterprise system, such as a financial institution system, in which thousands of data message requests may be received at any one point in time, by only having to read in a portion of the message to transform in a single pass, data processing efficiency is realized.

A system for inline transformation of data defines first embodiments of the invention. The system includes a target system including a first computing platform having a first memory and at least one first processor in communication with the first memory. The target system is configured to receive data request messages and, in response to receiving the data request message and performing request processing per the request, generate and communicate data response messages.

The system additionally includes platform integration system including a second computing platform having a second memory and at least one second processor in communication with the second memory. The platform integration system includes a data transformation module that is stored in the second memory and executable by the second processor. The data transformation module is configured to receive the data response messages from the target system and process, in parallel during a single pass, the data response messages. The processing of the data response messages includes (1) parsing the data response messages to (i) remove generic headers from the data response messages and (ii) extract common data elements from the data response messages, and (2) while parsing, transforming the data response messages from a first format to an intermediary format.

In specific embodiments of the system, the data transformation module includes a SAX (Simple API (Application Program Interface) for XML (Extensible Markup Language)) parser that is configured to perform the parallel processing of the data response messages by implementing a single filter to parse and transform the data response messages. In such embodiments of the system, the data transformation module may be further configured to process the data response messages by transforming the data response messages from a text format to a SAX data stream. In such embodiments of the system, the data transformation module may be further configured to stream the SAX data stream directly to a target canonical transformation routine absent fully storing the SAX data stream in the second memory. In such embodiments of the system, the data transformation module may be further configured to implement the target-specific transformation routine to transform the SAX data stream to a target canonical format, for example, the target canonical transformation routine may be configured to implement Extensible Stylesheet Language Transformations (XSLT) graphical data mapping to transform the SAX data stream to XSLT. In such embodiments of the system, the data transformation module may be further configured to implement the target-specific transformation routine to convert, inline while transforming, the data response messages to Document Object Module (DOM) documents. In further related embodiments of the system, the data transformation module may be further configured to apply the previously extracted common data elements to the DOM documents prior to communicating the data response messages to the source system.

In further specific embodiments of the system, the data transformation module is further configured to process, in parallel during the single pass, the data response messages by (1) parsing the data response messages to (i) remove the generic headers, in the form of Simple Object Access Protocol (SOAP) envelope headers, from the data response messages In still further embodiments of the invention, the data transformation module is further configured to process, in parallel during the single pass, the data response messages by (1) parsing the data response messages to (ii) extract common data elements, including error codes, fault codes and status codes, from the data response messages.

In still further specific embodiments the system includes a source system including a third computing platform having a third memory and at least one third processor in communication with the third processor. The source system is configured to generate, and communicate to the platform integration system, the data request messages. In such embodiments, the data transformation module is further configured to receive the data request messages and transform the received data request messages from an Extensible Stylesheet Language Transformations (XSLT) canonical format to an XML data format specified by an external entity/vendor. In further related embodiments of the system, the data transformation module is further configured to transform the data request messages from the an XML data format specified by an external entity/vendor to a target canonical format using Extensible Stylesheet Language Transformations (XSLT) graphical data mapping and apply target system-specific formatted Simple Object Access Protocol (SOAP) envelope headers to the target canonical formatted data request messages.

A computer-implemented method for inline transformation of data defines second embodiments of the invention. The method includes receiving, from a target computing system, data response messages that are generated by the target computing system in response to receiving a data request message. The method further includes processing, by a computing device processor, in parallel during a single pass, the data response messages by (1) parsing the data response messages to (i) remove generic headers from the data response messages and (ii) extract common data elements from the data response messages, and (2) while parsing, transforming the data response messages from a first format to an intermediary format.

In specific embodiments of the method, processing further includes processing, in parallel during the single pass, the data response messages by implementing a single SAX (Simple API (Application Program Interface) for XML (Extensible Markup Language)) filter to parse and transform the data response messages. In such embodiments of the method, transforming may further include (2) while parsing, transforming the data response messages from the first format to the intermediary format, wherein the first format is a text format and the intermediary format is a SAX data stream, wherein the SAX data stream is streamed directly to a target canonical transformation routine absent fully storing the SAX data stream in memory.

In other specific embodiments of the method, parsing further comprises (1) parsing the data response messages to (i) remove the generic headers, such as Simple Object Access Protocol (SOAP) envelope headers, from the data response messages and (ii) extract the common data elements, including error codes, fault codes and status codes, from the data response messages.

A computer program product including a non-transitory computer-readable medium defines third embodiments of the invention. The computer-readable-medium includes a first set of codes for causing a computer to receive, from a target computing system, data response messages, wherein the data response messages are generated by the target computing system in response to receiving a data request message. The computer-readable medium additionally includes a second set of codes for causing a computer to process, in parallel during a single pass, the data response messages by (1) parsing the data response messages to (i) remove generic headers from the data response messages and (ii) extract common data elements from the data response messages, and (2) while parsing, transforming the data response messages from a first format to an intermediary format.

Thus, systems, apparatus, methods, and computer program products herein described in detail below provide for inline/parallel processing of data response messages to both transform and parse the data in one pass. Parsing includes extracting common data elements (such as, error codes, fault codes, status codes and the like) from the message and deleting generic headers from the messages. In specific embodiments of the invention, the parallel processing of the present invention is made possible by implementation of a SAX (Simple API (Application Program Interface) for XML (Extensible Markup Language) parser. In such embodiments of the invention, the SAX parser implements a single filter to both transform and parse the data response messages simultaneously. By performing the parsing of the data response messages inline, specifically, analysis of common data elements in-line, the present invention, eliminates the need to read the whole message first into memory and then perform requisite data analysis/processing.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
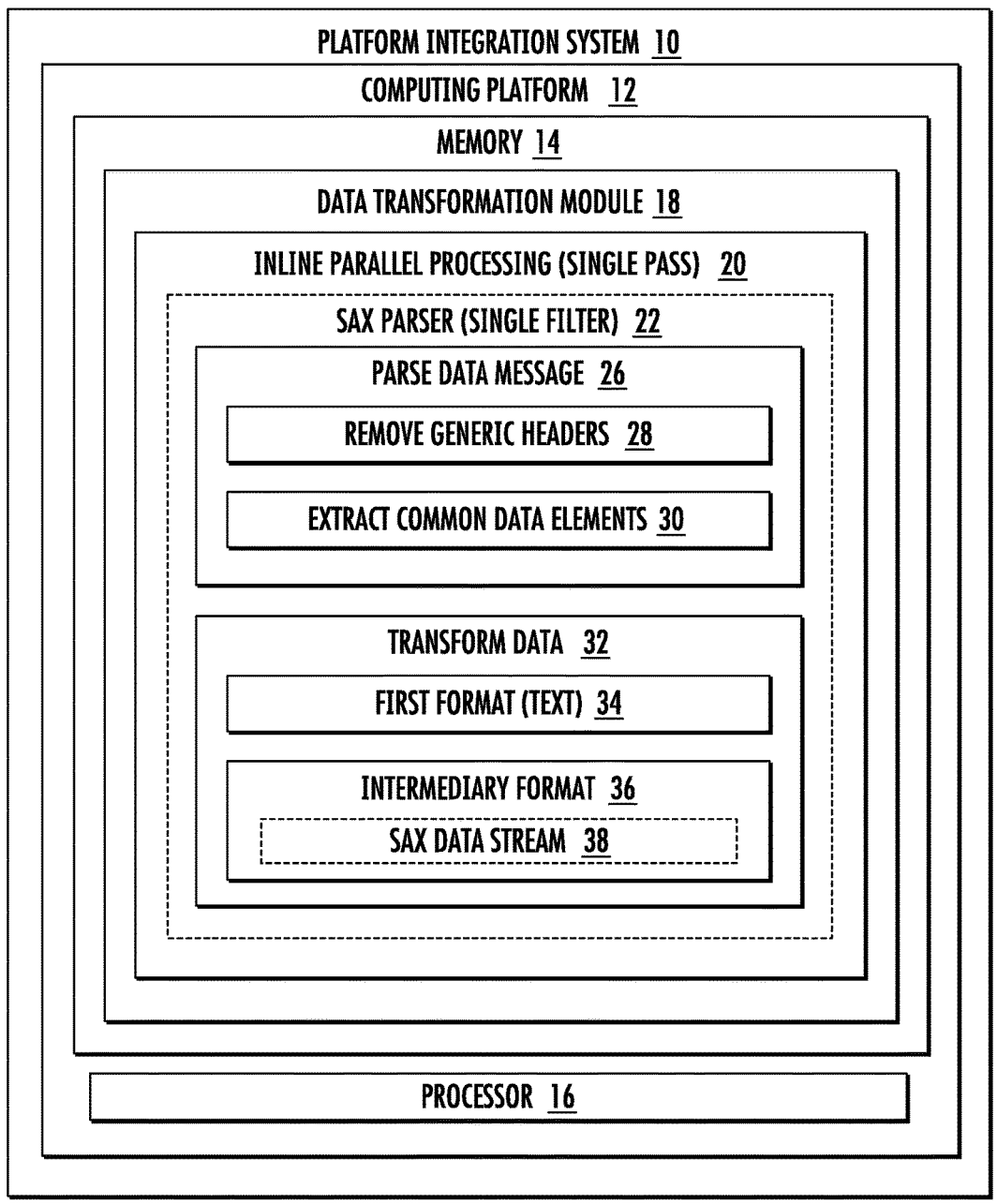
Figure 2:
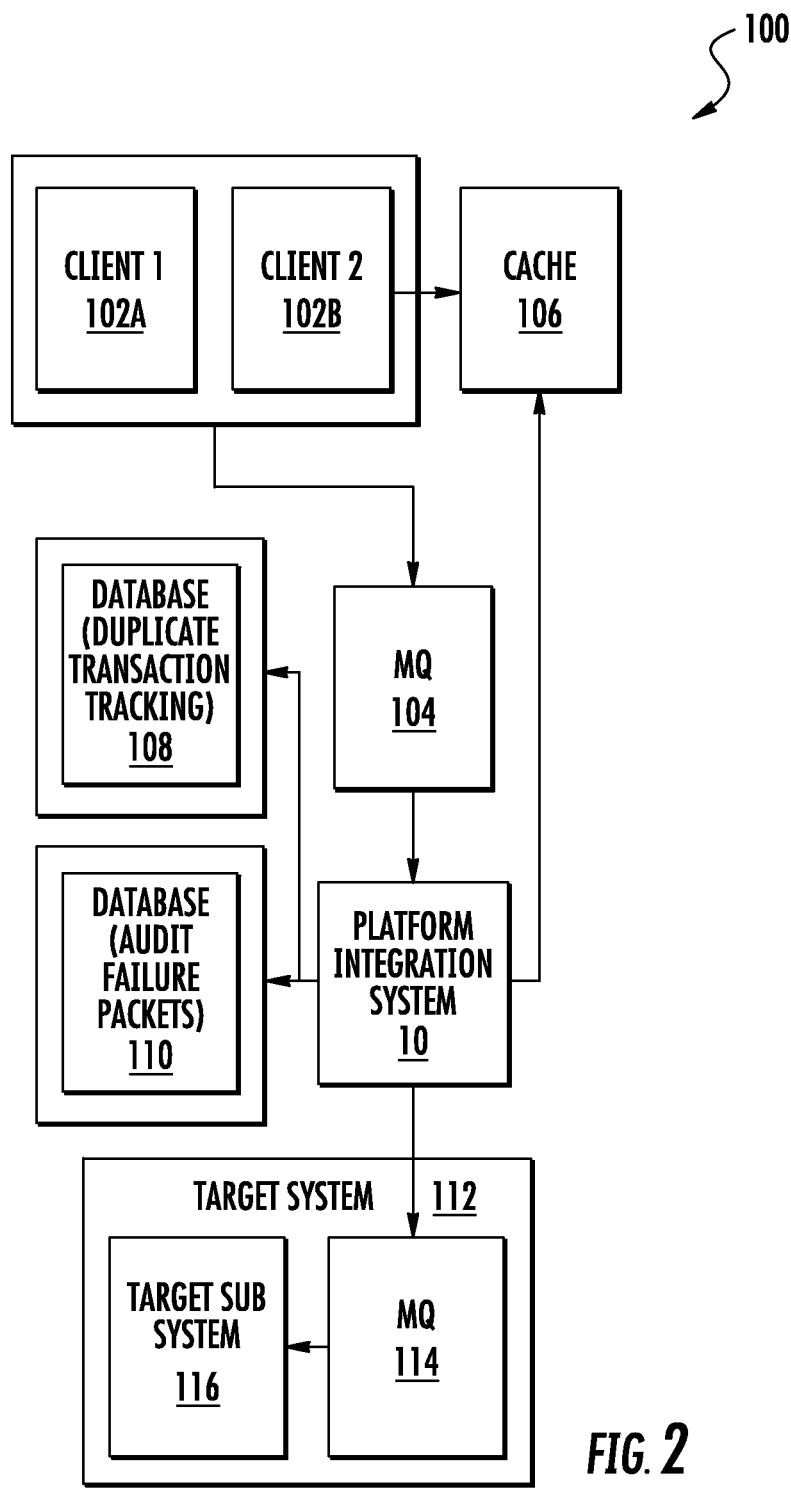
Figure 3:
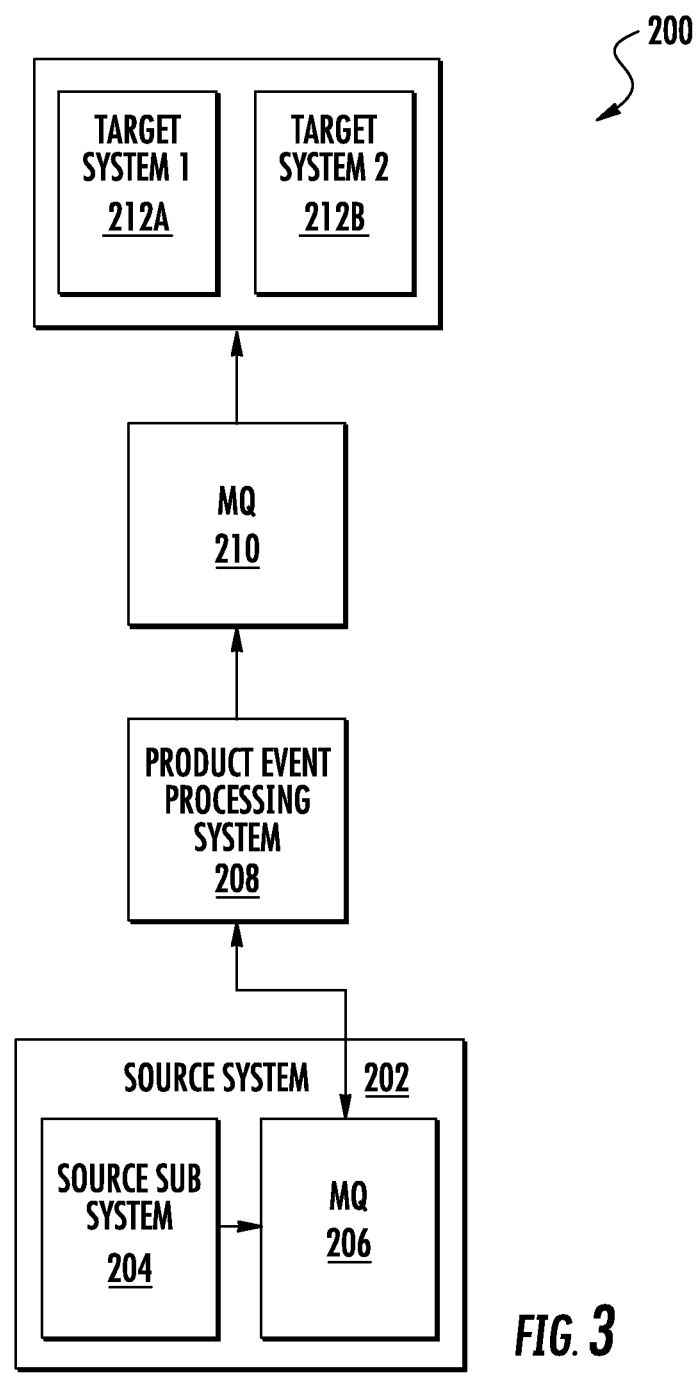
Figure 4:
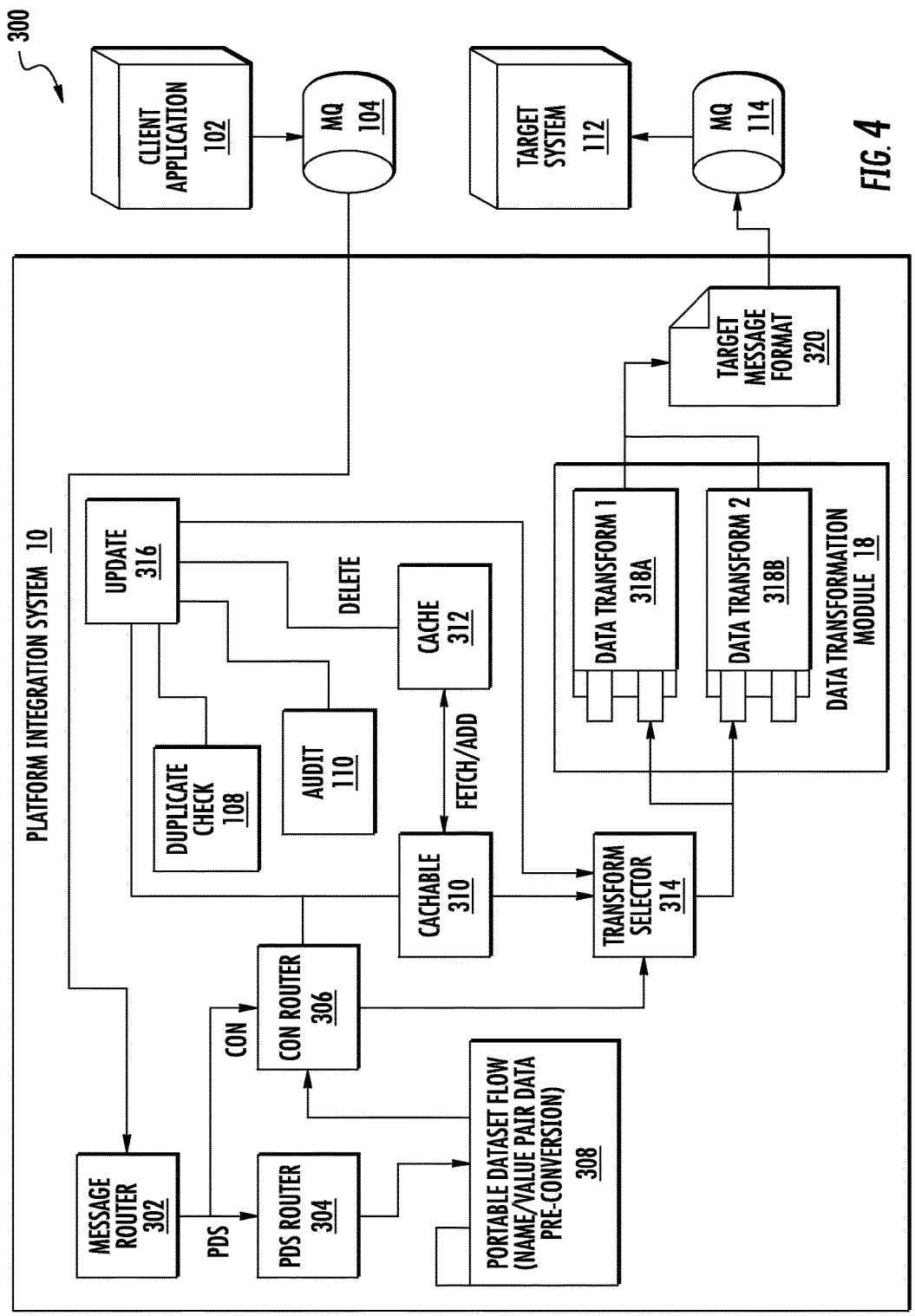
Figure 5:
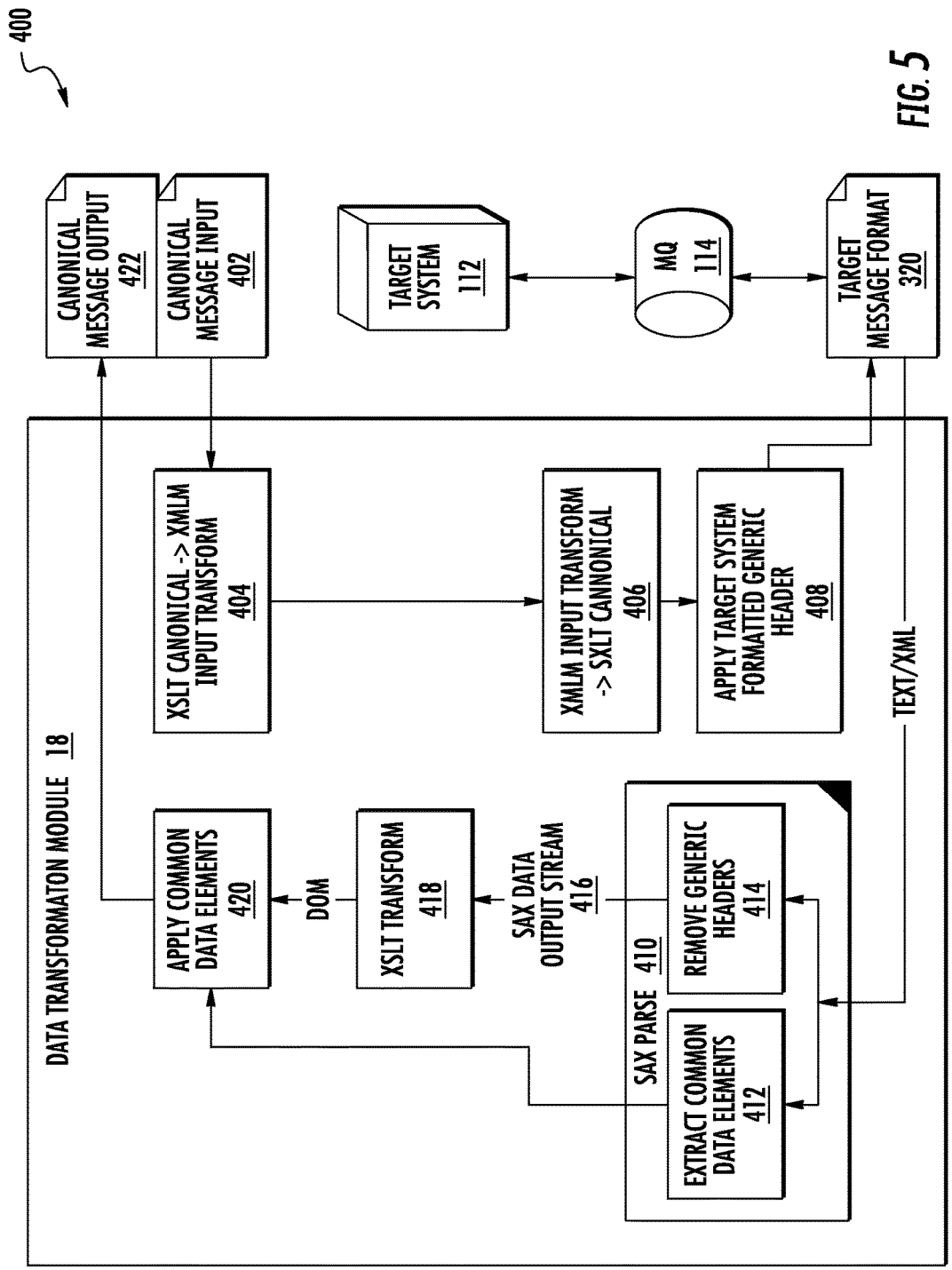
Figure 6:
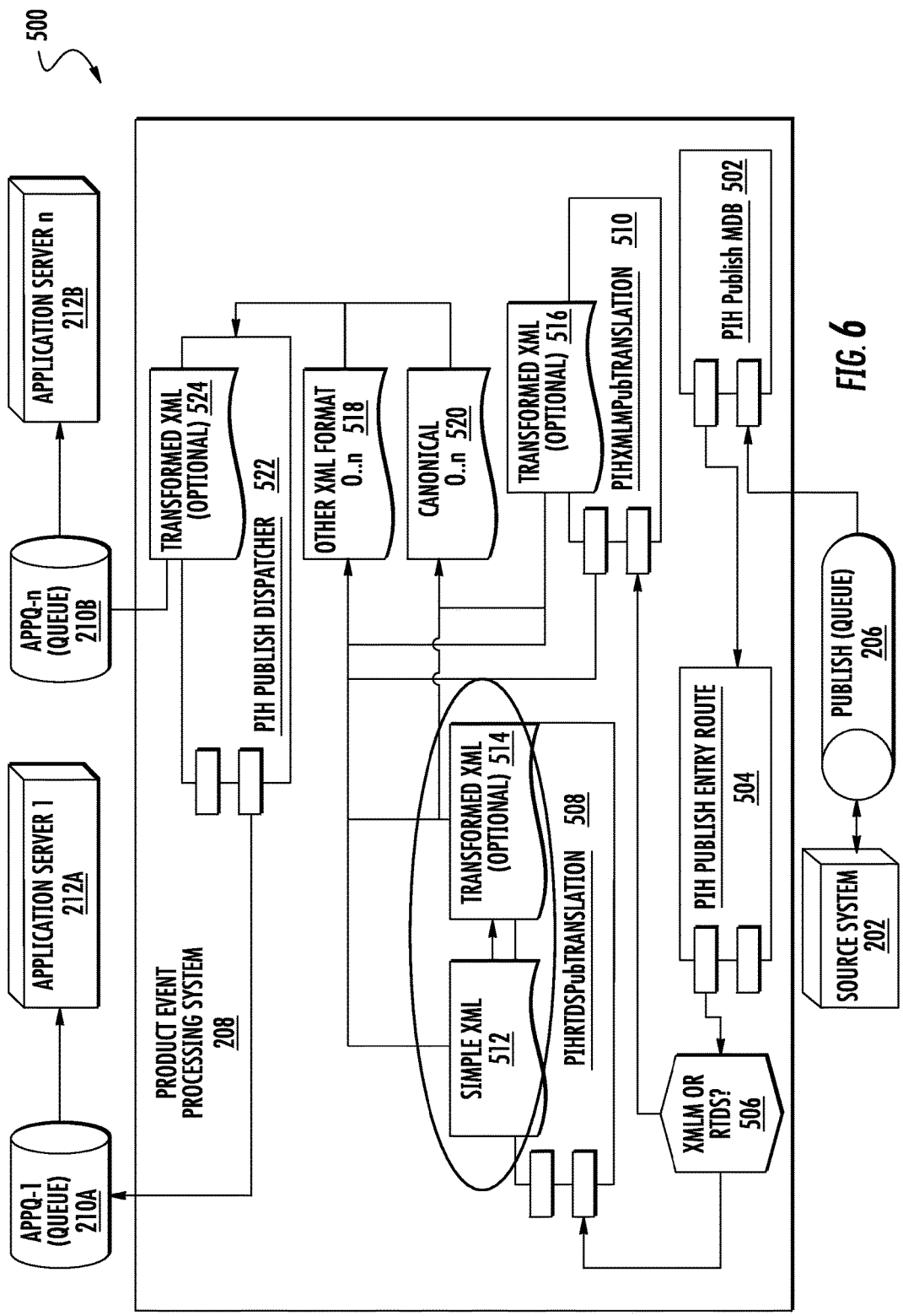
Figure 7:
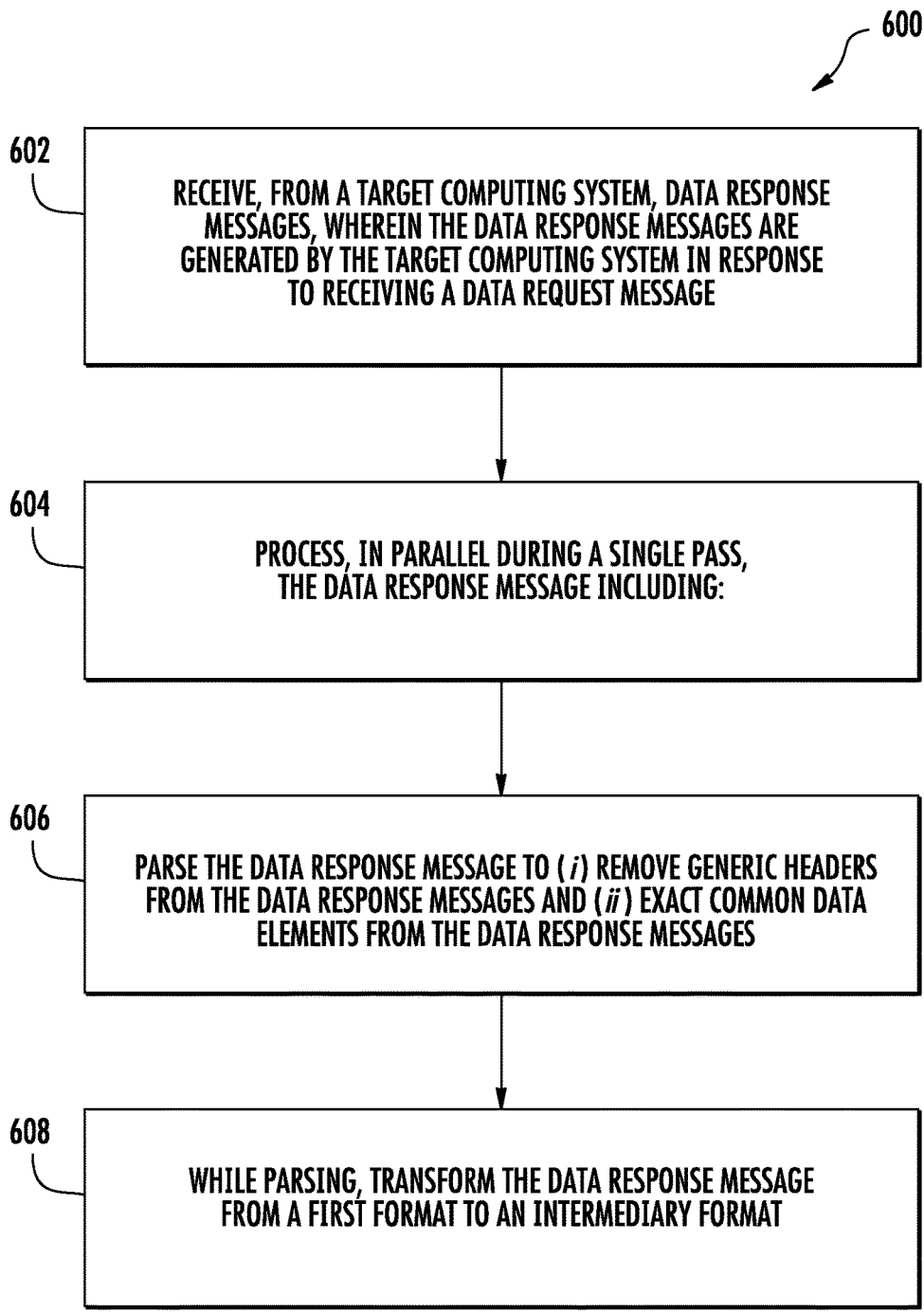

Having thus described embodiments of the invention in general terms, reference will now be made to the accompanying drawings, which are not necessarily drawn to scale, and wherein:

FIG. 1 provides a block diagram of a platform integration system, in accordance with embodiments of the present invention;

FIG. 2 provides a flow diagram of a bidirectional data message flow in which both data request messages and data response messages are processed, in accordance with embodiments of the present invention;

FIG. 3 provides a flow diagram of a unidirectional data message flow in which only data requests messages are processed, in accordance with embodiments of the invention;

FIG. 4 provides a modified block and flow diagram of a platform integration system, in accordance with embodiments of the present invention;

FIG. 5 provides a modified block and flow diagram of a data transformation module included within the platform integration system, in accordance with embodiments of the present invention;

FIG. 6 provides a modified block and flow diagram of product event processing system, in accordance with embodiments of the present invention; and FIG. 7 provides a flow diagram of a method for inline transformation and processing of data response messages, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for inline (i.e., parallel) processing of data response messages to both transform and parse the data in one pass. Parsing includes extracting common data elements (such as, error codes, fault codes, status codes and the like) from the message and deleting generic headers from the messages. In specific embodiments of the invention, the parallel processing of the present invention is made possible by implementation of a SAX (Simple API (Application Program Interface) for XML (Extensible Markup Language) parser. In such embodiments of the invention, the SAX parser implements a single filter to both transform and parse the data response messages simultaneously.

By performing the parsing of the data response messages and transformation inline, specifically, analysis of common data elements in-line, the present invention, eliminates the need to read the whole message first and then perform requisite analysis. In conventional processing of data messages, the entire message is read into a buffer, a tree of members is built and the tree is then analyzed, thus, requiring two passes. In the present invention, by reading in the data and transforming the data together in one pass, the amount of processing required is minimized (e.g., 50 percent less processing), thus requiring less burden on the processor. In an enterprise system, such as a financial institution system, in which thousands of data message requests may be received at any one point in time, by only having to read in a portion of the message to transform in a single pass, data processing efficiency is realized.

Referring to FIG. 1, a block diagram is provided of platform integration system 10 configured to perform inline/parallel processing of data response messages such that both transformation and parsing occurring within a single pass; in accordance with embodiments of the present invention. The platform integration system 10 includes a computing platform 12 which may comprise multiple computing devices, such as multiple servers, routers and the like. The computing platform 12 includes a memory 14 and at least one processor 16 in communication with the memory 14. Computing platform 12 can receive and execute algorithms, such as modules, routines, and applications.

Memory 14 may comprise volatile and non-volatile memory, such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk. Moreover, memory 14 may comprise cloud storage, such as provided by a cloud storage service and/or a cloud connection service.

Further, processor 16 may be an application-specific integrated circuit ("ASIC"), or other chipset, processor, logic circuit, or other data processing device. Processor 16 or other processor such as ASIC may execute an application programming interface ("API") (not shown in FIG. 1) that interfaces with any resident programs or modules, such as data transformation module 18 and routines, sub-modules associated therewith or the like stored in the memory 14 of computing platform 12.

Processor 16 includes various processing subsystems (not shown in FIG. 1) embodied in hardware, firmware, software, and combinations thereof, that enable the functionality of system 10 and the operability of the system on a network. For example, processing subsystems allow for initiating and maintaining communications and exchanging data with other networked computing platforms, such as client applications 102 (shown in FIG. 2) and target systems 112 (shown in FIG. 2). For the disclosed aspects, processing subsystems of processor 16 may include any subsystem used in conjunction with data transformation module 18 and related algorithms, sub-algorithms, modules, sub-modules thereof.

Computer platform 12 may additionally include a communications module (not shown in FIG. 1) embodied in hardware, firmware, software, and combinations thereof, that enables communications among the various components of the computing platform 12, as well as between the other networked devices. Thus, communication module may include the requisite hardware, firmware, software and/or combinations thereof for establishing and maintaining a network communication connection.

Memory 14 of computing platform 12 stores data transformation module 26 that is executable by processor 16 and configured to provide inline/parallel processing 20 of data messages, specifically data response messages, such that, transformation and parsing of the data response messages occur in one single pass. In specific embodiments of the invention, the inline parallel processing 20 of the data is made possible by implementation of a SAX (Simple API (Application Program Interface) for XML (Extensible Markup Language) parser 22 which employs a single filter to simultaneously parse 26 the data message and transform 32 the data in the message. In specific embodiments of the invention, parsing the data message includes removing generic headers 28 from the messages and extracting common data elements 30. Transformation 32 of the data provides for transforming/converting the data from a first format 34, such as a text format or the like, to an intermediary format 36, such as a SAX data stream format 38 or the like.

Referring to FIG. 2, a modified block and flow diagram is provided that illustrates bi-directional data message flow 100, which includes both data request message processing and data response message processing, in accordance with embodiments of the present invention. A plurality of different client applications 102A and 102B generate and communicate data request messages. The client applications may be associated internal entities and/or external entities (i.e., third parties or the like). For example, in those embodiments in which the entity associated with the platform integration system 10 is a financial institution, the data request messages may comprise transactions or the like sent from different financial institution or the like. The disparate client applications 102A, 102B and the like may each format their respective data request messages differently. Therefore, the platform integration platform 10 is implemented to transform and process the data request messages in advance of communicating the messages to a respective target system 112. Similar to the client applications, the target systems 112, may require target-specific formatting of the data request messages.

The data request messages are communicated to Message Queue (MQ) 104 for storing, queuing and transporting messages for subsequent processing. While a MQ 104 is shown in FIG. 2 as the transport mechanism, in other embodiments other transport mechanisms such as SOAP (Simple Object Access Protocol), HTTP (Hyper Text Transfer Protocol), REST (Representation State Transfer) may be implemented.

MQ 104 communicates the data request messages to platform integration system 10, which is configured to provide data transformation and other processing of the data request messages. Specific, to the present invention, as briefly discussed previously in relation to FIG. 1 and discussed at length, infra. In relation to FIG. 5, the data transformation that occurs within the platform integration system 10 is configured to provide inline/parallel processing of the transformation and parsing of data messages, such that transformation and parsing occurring in one single pass, without having to read the entire message into memory. Additionally, as described in more detail, infra., in relation to FIG. 4, platform integration system 10 is in communication with cache 106 which stores data responses for data request messages that are queries that are cacheable. In addition, if the data request message is for a data update, the cache 106 may be accessed to delete the query data for those requests/transactions so new data can be pulled with the appropriate updates.

Additionally, platform integration system 10 is in communication with database 108, which stores duplicate request/transaction tracking data. For those data requests that are updates, the request includes a unique transaction ID that is checked against database 108 to determine if the data request message is a duplicate. If the data request message is determined to be a duplicate, the data request message is dropped/ignored, otherwise the data request message is forwarded for processing by the data transformation module 18. In addition, platform integration module 10 is in communication with database 110 that, in the event that a data request or response results in an error, stores failure/error information associated with the error for subsequent audit purposes or the like.

Once the platform integration system 10 has processed the data request messages, including transformation and associated processing, the data request messages are communicated to the target system 112, which may implement a message queue 114 for storing, queuing and transporting the data request messages to applicable target subsystems 116 for processing. While FIG. 2 is illustrative of the flow for a data request message a likewise flow for data response message (from the target to the client or response repository) is apparent.

Referring to FIG. 3 a modified block and flow diagram is provided that illustrates unidirectional message flow 200, which limited to data request message processing (i.e., not data response message is communicated/processed), in accordance with embodiments of the present invention. A source system 202 generate and communicate data request messages. The source system may be associated internal entities and/or external entities (i.e., third parties or the like). For example, in those embodiments in which the entity associated with the product event processing system 208 is a financial institution, the data request messages may comprise transactions or the like sent from different financial institution or the like. The disparate source systems 202 and the like may each format their respective data request messages differently. Therefore, the product event processing system 208 is implemented to transform and process the data request messages in advance of communicating the messages to a respective target system 212A or 212B. Similar to the source system 202, the target systems 212A and 212B, may require target-specific formatting of the data request messages.

The source system 202 may include one or more source subsystems 204 which generate the data request messages and communicate the messages to an internal message queue (MQ) 206 for storage, queuing and transport of the data request messages to the product event processing system 208.

The source system 202 communicates the data request/ transaction messages to the product event processing system 208 which transforms and processes the data request messages. Specific, to the present invention, as briefly discussed previously in relation to FIG. 1 and discussed at length, infra. in relation to FIG. 6 the product event processing system 208 provides for streaming transformation of the data request message, specifically, according to specific embodiments from a simple XML format to a transformed XML format, absent a need to hold the data in memory (i.e., streaming transformation).

Once processed at the product event processing system 208, the data request messages 208 are communicated to Message Queue (MQ) 208 for storing, queuing and transporting messages to one of a plurality of target systems, such as target systems 212A, 212B or the like. While a MQ 208 is shown in FIG. 3 as the transport mechanism, in other embodiments other transport mechanisms such as SOAP (Simple Object Access Protocol), HTTP (Hyper Text Transfer Protocol), REST (Representation State Transfer) may be implemented.

MQ 210 communicates the data request/transaction messages to the target system 212A, 212B that is associated with the data request for subsequent processing.

Turning the reader's attention to FIG. 4, a modified block and flow diagram is provided of a system 300 for inline transformation and processing within a bidirectional request and response processing flow, in accordance with embodiments of the present invention. Specifically, FIG. 4 highlights the flow for data request messages within the bi-directional flow. As discussed in relation to FIG. 2, client application 102 generates and initiates communication of data request/transaction messages which are received by Message Queue (MQ) 104 for storage, queuing and subsequent transport/communication to the platform integration system 10. The message queue 104 is configured to receive data request messages from a plurality of different client applications 102.

Initially, within the platform integration system 10, the data request/transaction messages are communicated to message router 302. In specific embodiments of the invention, the platform integration system implements Apache Camel™ (available from the Apache Software Foundation) as the routing means, although any other rule-based routing and mediation engine may be used as the application dictates. Router 302 determines message type/file format which may be one of (1) Portable Data Set (PDS) (i.e., name/value pair), or (2) Canonical format (CON) (i.e., basic structured XML data with a standard header defined for the platform integration system).

According to specific embodiments of the invention, platform integration system 10 uses Canonical data to map request messages to the target format. As such, if router 302 determines that the request message is PDS format, the request message is forwarded to PDS router 304, which in turn forwards the message to Portable Data Set flow 308 for transforming the PDS format to the Canonical format (i.e., name/value pair data pre-conversion) prior to communicating the request message to the Canonical router 306. If the router 302 determines that the request message is CON format, the request message is routed directly to CON router 306.

Once all request messages are in Canonical format, CON router 306 is configured to determine if the request message is (i) a query, or (ii) an update. Additionally, if the request message is determined to be a query, a further determination is made as to whether the query is cacheable (i.e., a response to the query is capable of being stored in cache) based on configuration of the request message. If the Canonical router 302 determines that the request message is a query but not cacheable based on message configuration, the data message is directly communicated to the transform selector 314. If the Canonical router 302 determines that the request message is cacheable 310 based on the configuration including a locator for the cache key (e.g., an XPath locator or other means of selecting/locating nodes within an XML document), a call-out to the cache 312 is made to determine if the response message is in the cache. If the response message is determined to be in the cache 312 the response message is returned/fetched from the cache and returned back to the client application 102, resulting in the end of processing (i.e., no further processing of the request message is warranted). If the response message is determined to not be in the cache 312, the request message is communicated to the transform selector 314. It should be noted that if the request message is a cacheable query in which the cache does not include the response, upon subsequent response message returned from the target system 112 will be placed in the cache 312 before the response message is communicated to the caller/client application 102.

If the Canonical router 306 determines that the request message is an update 316, a call-out is made to the database 108 to perform a duplicate check (i.e., verify that the update is not a duplicate request). Request messages that are updates include a unique transaction identifier assigned by the client application 102. The transaction identifier is checked against the database 108 to determine if the request is a duplicate request. If the transaction identifier is located in the database 108, the request message is dropped/ignored and no further processing is performed. If the transaction identifier is not located in the database 108, the request message is communicated to the transform selector 314.

Based on message configuration, the transform selector 314 determines which transform (data transform 1 318A, data transform 2 318B and so on) will be implemented to transform the request message. Specifically, according to embodiments of the invention, the request/transaction name will dictate which data transform will be implemented to transform the message into the target message format 320. If the request message is a query and transform selector 314 process results in an error, the error data is stored in database 110 for subsequent audit purposes or the like. Once the data transformation process 318A, 318B or the like, is implemented and the request has been transformed to the target message format 320, the request message is communicated to MQ 114 for storage, queuing and transport of the message and, subsequently communicated to the target system 112 for requisite processing. The response message from the target system 112 is processed through the platform integration system 10 to transform the response message back to the Canonical format of the user/client application 102. Such transformation/processing of the response message is described in detail in relation to FIG. 5, infra.

In response to the target system 112 returning a successful response message of an update request message, if there are one more cache keys associated with the update (based on the configuration of the request/response), the query data associated with these transactions will be deleted from the cache 312 so that new data can be pulled with the appropriate updates. In addition, for successful response messages the transaction identifier will be added to database 108 to prevent a duplicate request message from being subsequently processed.

Referring to FIG. 5 a modified block and flow diagram is presented that a system 400 for inline processing of data response messages within the data transformation module 18, in accordance with embodiments of the present invention. At Event 402, the data request message is communicated by the client application/source and received by the platform integration system 10 (shown in FIG. 4). The platform integration system 10 processes the request message as shown in FIG. 4 and described above. Once the processing within the platform integration system 10 reaches the data transformation module 18, at Event 404, the format related to the client application, such as XSLT (Extensible Stylesheet Language Transformation) Canonical format is transformed to an intermediary format, such as an XML data format specified by an external entity/vendor ((TSYS (Total Systems Services formatted XML) and, at Event 406, the intermediary format, such as an XML data format specified by an external entity/vendor, is transformed, by a mapping process, to a format related to the target system, such as XSLT (Extensible Stylesheet Language Transformation) Canonical format.

At Event 408, generic headers are applied to the transformed data request, such as a SOAP (Simple Object Access Protocol) envelope or the like. Once the generic headers are applied, the request message is in target message format 320, which is communicated to MQ 114, which stores queues and transports the data request to target system 112.

The target system 112 responds with a response message which is communicated to MQ 114, which stores, queues and transports the response message to the platform integration system 10. The data transformation module 18 receives the response message in the target message format 320, which is a text version of an XML document. At Event 420, the data transformation module 18 processes the response message inline by implementing a SAX parser, which through the use of a single filter (i.e., one pass) parses the response message while the response message is being transformed/re-formatted. Specifically, the parsing processing entails, at Event 412, extracting common data elements, such as error codes, fault codes, status codes and the like and, at Event 414, removing/discarding generic headers, such as previously applied SOAP envelopes or the like. Removal of the generic header provides for ease in downstream transformations of the function specific portion of the response message. While Events 412 and 414 are ensuing, SAX parser 410 is transforming the data from the format associated with the target message format, i.e., the text format, to an intermediary format, such as SAX data stream 416. The outputted intermediary formatted response message, such as SAX data stream 416 is not fully held in memory (not held in processor memory, RAM (Random Access Memory) or the like).

At Event 418, the intermediary format, such as the SAX data stream 416 is transformed to client/source Canonical format as a Java™ object DOM (Document Object Model) document using a graphical data mapping process, such as Mapforce™ (available from Altova® Incorporated of Beverley, Mass.) generated XSLT transform or the like. In specific embodiments of the invention, the DOM object conversion occurs inline with the XSLT transformation. The DOM format provides for further direct in-memory data processing without having to re-parse and/or re-generate the XML text document. At Event 420, the common data elements that were extracted during the parsing process (Event 412) are applied to the client/source Canonical formatted response message and further processing within the platform integration system 10 ensues (not shown in FIG. 5). Once processing within the platform integration system is completed, at Event 422, the data response message is outputted to the client application/source system or the like.

Referring to FIG. 6, a modified block and flow diagram is depicted for a system 500 that provides for transformation and processing within a unidirectional request processing flow, in accordance with embodiments of the present invention. The source system 202 generates and asynchronously enqueues a request message through publish/queue 206, which communicates the message to the product event processing system 208. Since the processing of the request message is unidirectional, the source system 202 will not receive a response message and will not wait for product event processing system 208 to complete.

Initially, Process Integration Hub (PIH) Publish MDB (Message Driven Bean) receives the request message and initiates a rule-based routing and mediation engine, e.g., Apache Camel™ or the like to create a messaging session through PIH Publish Entry Route 504. The queue 206 from which the request message was received will define the initial service name used in the remainder of the product event processing system 208 flow. An optional expression, such as an XPath (XML Path language) expression or the like, may be defined to determine which flow within the system 208 that the request message will take by matching specific data in the request message to data associated with a specific flow. In the event the optional expression is defined and a flow is determined, a new service name is applied to define the flow for each matching condition.

At Decision 506, a determination is made as to whether the data request will be processed as (1) a fixed field COBOL copybook data format specified by an external entity/vendor, or the like, or (2) an XML data format specified by an external entity/vendor (TSYS (Total System Services) for XML) formatted or (3) XLM. For the sake of brevity, the flow for XLM formatted request messages is not shown in FIG. 6 but would be similar to the flow depicted and described for an XML data format specified by an external entity/vendor. The determination as to request message format is made based configuration and the initial service name (or new service name applied) of the request message.

If the request message is determined, at Decision 506, to be in a fixed field COBOL copybook data format specified by an external entity/vendor, the request message is communicated to PIH fixed-field COBOL Publish Translation 508 and, at Event 512, a pre-translation is performed to transform the request to a simple XML format. The translation to simple XML is performed using a configuration file including field offsets and simple record structure definitions. In specific embodiments of the product event processing system 208, further transformation to the target format may be performed immediately (within the PIH fixed-field COBOL Pub Translation 508) or subsequently within the PIH Publish Dispatcher 522. In the event that transformation to the target format is performed immediately, and in accordance with embodiments of the present invention, the output to the simple XML format is a data stream not held in memory, but rather is passed directly to, Event 514, at which an XSLT transform is used to transform the simple XML to a more structured XML (i.e., the format of the target system). In specific embodiments, the XSLT transformation is performed by a graphical data mapping process, such as Mapforce™ to create a graphic mapping of the simple XML data to a logical structure used by the target system/application 212A or 212B without the complexity of performing such a transformation in code.

If the request message is determined, at Decision 506, to be an XML data format specified by an external entity/vendor, the request message is communicated to PIH XML data format Publish Translation 510. In specific embodiments of the product event processing system 208, transformation of the XML data format specified by an external entity/vendor may be performed within the PIH XML data format Publish Translation 510 or subsequently within the PIH Publish Dispatcher 522. If the an XML data format specified by an external entity/vendor translation is configured to occur at the PIH XML data format Publish Translation 510, at Event 516, the entity-specified XML formatted data requests are transformed to the structured XML format (i.e., the format of the target system). Since the an XML data format specified by an external entity/vendor has TSYS (Total Systems Services) specific processing is applied, at Event 516, to parse and remove extra header information associated with TSYS. Additionally, at Event 516, an optional transform may be performed that would provide for the request message to be universal in application (i.e., not specific to any one target system application).

Once the transformations 512, 514 or 516 have occurred, at Event 518, a marker is added for other XML formats and, at Event 520, a marker is added for Canonical format. The request message requires a marker to allow for multiple message formats/translations from a single TSYS publish. The marker is used by the PIH Publish Dispatcher 522 to determine the appropriate destination(s) (i.e., target systems/applications) for each transformed data request.

Once the markers have been inserted into the data requests, the requests are communicated to the PIH Publish Dispatcher 522. If structured transformation (Event 514 and Event 516) was not configured to be performed at the Publish Translation stage 508 or 510, Event 524, may proceed, which transforms the data from the simple XML format of the an XML data format specified by an external entity/vendor to the structured XML format. Once all transformations have been completed, PIH Publish Dispatcher 522 communicates the request messages to one of the queues 210A or 210B associated with the destination target system/application 212A or 212B. The messages are enqueued at queues 210A and 210B for the associated applications 212A and 212B to retrieve asynchronously.

Referring to FIG. 7 a flow diagram is presented on a method 600 for inline data message transformation, in accordance with embodiments of the present invention. At Event 602, a data message response is received from a target computing system. The data message response is part of a bidirectional message flow, in which, the data message response is generated by the target computing system in response to receipt of a corresponding data request message.

At Event 604, the data response message is parallel processed during a single pass. Such parallel processing includes, at Event 606, parsing the data response message to (i) remove and discard generic headers, such as SOAP envelopes from the response message and (ii) extract common data elements from the body of the message, such as fault codes, error codes, status codes and the like. In addition, such parallel processing includes, at Event 608, while parsing the response message, transforming the data response message from a first format, e.g., text format to an intermediary format, e.g., SAX data stream. In specific embodiments of the invention, such parallel, inline processing is made possible by implementing a SAX parser that parses the data inline while the data is being transformed.

Thus, systems, apparatus, methods, and computer program products described above provide for inline/parallel processing of data response messages to both transform and parse the data in one pass. Parsing includes extracting common data elements (such as, error codes, fault codes, status codes and the like) from the message and deleting generic headers from the messages. In specific embodiments of the invention, the parallel processing of the present invention is made possible by implementation of a SAX parser. In such embodiments of the invention, the SAX parser implements a single filter to both transform and parse the data response messages simultaneously. By performing the parsing of the data response messages inline, specifically, analysis of common data elements in-line, the present invention, eliminates the need to read the whole message first into memory and then perform requisite data analysis/processing.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for inline transformation of data, the system comprising:
    a target system comprising a first computing platform having a first memory and at least one first processor in communication with the first memory, wherein the target system is configured to receive data request messages and, in response to receiving the data request message, generate and communicate data response messages; and
    a platform integration system comprising:
        a second computing platform having a second memory and at least one second processor in communication with the second memory, and
        a data transformation module stored in the second memory, executable by the second processor, and configured to:
            receive the data response messages from the target system,
            process, in parallel during a single pass, the data response messages by a Simple Application Program Interface for Extensible Markup Language (SAX) parser having a single SAX filter, wherein the single SAX filter is configured to:
                (1) parse the data response messages to (i) remove generic headers from the data response messages and (ii) extract common data elements from the data response messages, and
                (2) in parallel with parsing, transform the data response messages from a text format to SAX data stream format,
            execute a source canonical transformation routine that implements Extensible Stylesheet Language Transformations (XSLT) graphical data mapping to (i) transform the SAX data stream to XSLT, and (ii) convert, inline while transforming the SAX data stream to XSLT, the data response messages to Document Object Module (DOM) documents,
            apply the previously extracted common data elements to the DOM documents prior to communicating the data response messages to a source system,
            wherein the transforming of the data messages from the text format to the SAX data stream format occurs absent fully storing the data response messages in the second memory and wherein by processing the data response messages in parallel during a single pass such that parsing and transformation occur simultaneously an overall time for processing the data response messages is minimized.

2. The system of claim 1, wherein the data transformation module is further configured to stream the SAX data stream directly to the source canonical transformation routine absent fully storing the SAX data stream in the second memory.

3. The system of claim 1, wherein the data transformation module is further configured to process, in parallel during a single pass, the data response messages by (1) parsing the data response messages to (i) remove generic headers from the data response messages, wherein the generic headers comprise Simple Object Access Protocol (SOAP) envelope headers.

4. The system of claim 1, wherein the data transformation module is further configured to process, in parallel during a single pass, the data response messages by (1) parsing the data response messages to (ii) extract common data elements from the data response messages, wherein the common data elements include error codes, fault codes and status codes.

5. The system of claim 1, wherein the source system comprises a third computing platform having a third memory and at least one third processor in communication with the memory, wherein the source system is configured to generate, and communicate to the platform integration system, the data request messages and wherein the data transformation module is further configured to receive the data request messages and transform the received data request messages from an Extensible Stylesheet Language Transformations (XSLT) canonical format to an XML data format specified by an external entity/vendor.

6. The system of claim 5, wherein the source system is further configured to generate, and communicate to the platform integration system, the data request messages and wherein the data transformation module is further configured to transform the data request messages from the an XML data format specified by an external entity/vendor to a target canonical format using Extensible Stylesheet Language Transformations (XSLT) graphical data mapping and apply target system-specific formatted Simple Object Access Protocol (SOAP) envelope headers to the target canonical formatted data request messages.

7. A computer-implemented method for inline transformation of data, the method comprising:
    receiving, from a target computing system, data response messages, wherein the data response messages are generated by the target computing system in response to receiving a data request message;
    processing, by a computing device processor, in parallel during a single pass, the data response messages by implementing a Simple Application Program Interface for Extensible Markup Language (SAX) parser having a single SAX filter, wherein the single SAX filter:
        (1) parses the data response messages to (i) remove generic headers from the data response messages and (ii) extract common data elements from the data response messages, and
        (2) in parallel with parsing, transforms the data response messages from a text format to SAX data stream format;
    executing a source canonical transformation routine that implements Extensible Stylesheet Language Transformations (XSLT) graphical data mapping to (i) transform the SAX data stream to XSLT, and (ii) convert, inline while transforming the SAX data stream to XSLT, the data response messages to Document Object Module (DOM) documents; and applying the previously extracted common data elements to the DOM documents prior to communicating the data response messages to a source system, wherein the transforming of the data messages from the text format to the SAX data stream format occurs absent fully storing the data response messages in the second memory and wherein by processing the data response messages in parallel during a single pass such that parsing and transformation occur simultaneously an overall time for processing the data response messages is minimized.

8. The method of claim 7, wherein parsing further comprises (1) parsing the data response messages to (i) remove the generic headers from the data response messages, wherein the generic headers comprise Simple Object Access Protocol (SOAP) envelope headers and (ii) extract the common data elements from the data response messages, wherein the common data elements include error codes, fault codes and status codes.

9. A computer program product comprising:
a non-transitory computer-readable medium comprising:
    a first set of codes for causing a computer to receive, from a target computing system, data response messages, wherein the data response messages are generated by the target computing system in response to receiving a data request message;
    a second set of codes for causing a computer to process, in parallel during a single pass, the data response messages by implementing a Simple Application Program Interface for Extensible Markup Language (SAX) parser having a single SAX filter, wherein the single SAX filter (1) parses the data response messages to (i) remove generic headers from the data response messages and (ii) extract common data elements from the data response messages, and (2) in parallel with parsing, transforms the data response messages from a text format to SAX data stream format;
    a third set of codes for causing a computer to execute a source canonical transformation routine that implements Extensible Stylesheet Language Transformations (XSLT) graphical data mapping to (i) transform the SAX data stream to XSLT, and (ii) convert, inline while transforming the SAX data stream to XSLT, the data response messages to Document Object Module (DOM) documents; and
    a fourth set of codes for causing a computer to apply the previously extracted common data elements to the DOM documents prior to communicating the data response messages to a source system,
wherein the transforming of the data messages from the text format to the SAX data stream format occurs absent fully storing the data response messages in the second memory and wherein by processing the data response messages in parallel during a single pass such that parsing and transformation occur simultaneously an overall time for processing the data response messages is minimized.

10. The computer program product of claim 9, wherein the second set of codes is further configured to process, in parallel during the single pass, the data response messages by (1) parsing the data response messages to (i) remove the generic headers from the data response messages, wherein the generic headers comprise Simple Object Access Protocol (SOAP) envelope headers and (ii) extract the common data elements from the data response messages, wherein the common data elements include error codes, fault codes and status codes.

* * * * *